(12) United States Patent
Moler et al.

(10) Patent No.: US 8,879,775 B2
(45) Date of Patent: *Nov. 4, 2014

(54) SMART MATERIAL ACTUATOR CAPABLE OF OPERATING IN THREE DIMENSIONS

(75) Inventors: Jeffery Moler, Sarasota, FL (US); Aaron Dickey, Sarasota, FL (US)

(73) Assignee: Viking AT, LLC, Sarasota, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/578,442

(22) PCT Filed: Feb. 17, 2011

(86) PCT No.: PCT/US2011/025292
§ 371 (c)(1),
(2), (4) Date: Aug. 10, 2012

(87) PCT Pub. No.: WO2011/103324
PCT Pub. Date: Aug. 25, 2011

(65) Prior Publication Data
US 2012/0308055 A1    Dec. 6, 2012

Related U.S. Application Data

(60) Provisional application No. 61/305,345, filed on Feb. 17, 2010.

(51) Int. Cl.
*H04R 11/02* (2006.01)
*H02N 2/04* (2006.01)
*H02N 2/18* (2006.01)
*H04R 17/00* (2006.01)

(52) U.S. Cl.
CPC ............... *H04R 17/00* (2013.01); *H02N 2/043* (2013.01); *H02N 2/186* (2013.01)

USPC ............................................ 381/398; 381/190

(58) Field of Classification Search
USPC .......... 381/150, 190, 386, 396, 398; 181/150, 181/157, 161, 173; 310/322, 324, 354, 328, 310/330, 331, 332, 333, 334
See application file for complete search history.

(56) References Cited

U.S. PATENT DOCUMENTS

| | | | |
|---|---|---|---|
| 1,922,196 | A | 8/1933 | Butler |
| 4,435,666 | A | 3/1984 | Fukui et al. |
| 4,442,372 | A | 4/1984 | Roberts |
| 4,518,887 | A | 5/1985 | Yano et al. |
| 4,547,086 | A | 10/1985 | Matsumoto et al. |
| 4,570,095 | A | 2/1986 | Uchikawa |
| 4,633,120 | A | 12/1986 | Sato et al. |

(Continued)

FOREIGN PATENT DOCUMENTS

| | | |
|---|---|---|
| JP | 2003251261 | 11/1991 |
| JP | 2004130681 | 5/1992 |

(Continued)

*Primary Examiner* — Davetta W Goins
*Assistant Examiner* — Amir Etesam
(74) *Attorney, Agent, or Firm* — William G. Giltinan; Carlton Fields Jorden Burt, PA

(57) ABSTRACT

A smart material actuator having more than two actuating arms, more than two mechanical webs, and being driven by a piezo or other smart material device within an enclosed compensator, and which may be adapted for use as an actuator, an energy capture device, or a sensor. In certain embodiments, the smart material actuator can also operate as the driver for an audio speaker.

23 Claims, 15 Drawing Sheets

(56) References Cited

U.S. PATENT DOCUMENTS

| | | |
|---|---|---|
| 4,783,610 A | 11/1988 | Asano |
| 4,870,827 A | 10/1989 | McFarlin et al. |
| 4,977,916 A | 12/1990 | Ohmi et al. |
| 5,096,388 A | 3/1992 | Weinberg |
| 5,751,091 A | 5/1998 | Takahashi et al. |
| 5,828,157 A | 10/1998 | Miki et al. |
| 5,946,969 A | 9/1999 | Munekata et al. |
| 6,213,739 B1 | 4/2001 | Phallen et al. |
| 6,359,370 B1 | 3/2002 | Chang |
| 6,435,840 B1 | 8/2002 | Sharma et al. |
| 6,513,213 B1 | 2/2003 | Muramatsu et al. |
| 6,520,479 B1 | 2/2003 | Sato |
| 6,548,938 B2 | 4/2003 | Moler et al. |
| 6,717,332 B2 | 4/2004 | Moler et al. |
| 6,737,788 B2 | 5/2004 | Moler et al. |
| 6,759,790 B1 | 7/2004 | Bugel et al. |
| 6,784,599 B1 | 8/2004 | Stoecklein et al. |
| 6,789,087 B1 | 9/2004 | Sako |
| 6,834,419 B2 | 12/2004 | Lopatin et al. |
| 6,836,056 B2 | 12/2004 | Oudshoorn et al. |
| 6,870,305 B2 | 3/2005 | Moler |
| 6,924,586 B2 | 8/2005 | Moler |
| 6,975,061 B2 | 12/2005 | Moler |
| 6,979,933 B2 | 12/2005 | Oudshoorn et al. |
| 7,036,769 B2 | 5/2006 | Wood |
| 7,040,349 B2 | 5/2006 | Moler et al. |
| 7,064,472 B2 | 6/2006 | Pelrine et al. |
| 7,104,768 B2 | 9/2006 | Richter et al. |
| 7,126,259 B2 | 10/2006 | Moler et al. |
| 7,132,781 B2 * | 11/2006 | Moler et al. ............ 310/328 |
| 7,163,385 B2 | 1/2007 | Gharib et al. |
| 7,190,102 B2 | 3/2007 | VanderSluis |
| 7,217,108 B2 | 5/2007 | Herwig et al. |
| 7,258,533 B2 | 8/2007 | Tanner et al. |
| 7,261,352 B2 | 8/2007 | Maslov et al. |
| 7,368,856 B2 | 5/2008 | Moler et al. |
| 7,429,815 B2 | 9/2008 | Gibson et al. |
| 7,453,187 B2 | 11/2008 | Richards et al. |
| 7,462,976 B2 | 12/2008 | Semmere et al. |
| 7,524,298 B2 | 4/2009 | Gharib et al. |
| 7,560,856 B2 | 7/2009 | Chen et al. |
| 7,564,171 B2 | 7/2009 | Moler et al. |
| 7,667,375 B2 | 2/2010 | Berkcan et al. |
| 7,687,977 B2 | 3/2010 | Xu |
| 7,915,790 B2 | 3/2011 | Heim et al. |
| 7,939,992 B2 | 5/2011 | Ehrlich |
| 2002/0109436 A1 | 8/2002 | Peng et al. |
| 2003/0006676 A1 | 1/2003 | Smith et al. |
| 2003/0127948 A1 | 7/2003 | Moler et al. |
| 2004/0035106 A1 | 2/2004 | Moler et al. |
| 2004/0263025 A1 | 12/2004 | Moler et al. |
| 2005/0116583 A1 | 6/2005 | Nishio et al. |
| 2005/0146248 A1 | 7/2005 | Moler et al. |
| 2005/0146698 A1 | 7/2005 | Hols et al. |
| 2005/0231077 A1 | 10/2005 | Moler et al. |
| 2006/0017349 A1 | 1/2006 | Moler et al. |
| 2006/0159568 A1 | 7/2006 | Lutz |
| 2007/0025868 A1 | 2/2007 | Swayze et al. |
| 2007/0247024 A1 | 10/2007 | Semmere et al. |
| 2008/0038128 A1 | 2/2008 | Haar |
| 2008/0061031 A1 | 3/2008 | Hashiguchi et al. |
| 2008/0170953 A1 | 7/2008 | Lund |
| 2008/0193307 A1 | 8/2008 | Elata et al. |
| 2008/0265712 A1 | 10/2008 | Ulm et al. |
| 2008/0315719 A1 | 12/2008 | Gibson et al. |
| 2008/0315722 A1 | 12/2008 | Clingman et al. |
| 2009/0047144 A1 | 2/2009 | Leece et al. |
| 2009/0152990 A1 | 6/2009 | Brown et al. |
| 2010/0111733 A1 | 5/2010 | Ramunas et al. |
| 2010/0207411 A1 | 8/2010 | Sun et al. |
| 2011/0046748 A1 | 2/2011 | Martin |
| 2011/0309721 A1 | 12/2011 | Moler |
| 2012/0001518 A1 | 1/2012 | Moler |
| 2012/0038245 A1 | 2/2012 | Moler et al. |
| 2012/0230848 A1 | 9/2012 | McQuary et al. |
| 2013/0234561 A1 | 9/2013 | Moler |

FOREIGN PATENT DOCUMENTS

| | | |
|---|---|---|
| JP | 04164581 | 6/1992 |
| JP | 07129244 | 5/1995 |
| JP | 07301354 | 11/1995 |
| JP | 09018064 | 1/1997 |
| JP | 09100930 | 4/1997 |
| JP | 2009183241 | 7/1997 |
| JP | 11146663 | 5/1999 |
| JP | 2002322129 | 11/2000 |
| JP | 2002058260 | 2/2002 |
| JP | 2002118303 | 4/2002 |
| JP | 2002263979 | 9/2002 |
| JP | 2003199366 | 7/2003 |
| JP | 2004048955 | 2/2004 |
| JP | 2004197754 | 7/2004 |
| JP | 2005149679 | 6/2005 |
| JP | 2005302711 | 10/2005 |
| JP | 2006138913 | 6/2006 |
| JP | 2007006616 | 1/2007 |
| JP | 2008029111 | 2/2008 |
| JP | 2008099399 | 4/2008 |
| JP | 2009048506 | 3/2009 |
| WO | 2009093907 | 7/2009 |
| WO | 2011006028 | 1/2011 |
| WO | 2011006164 | 1/2011 |
| WO | 2011029081 | 3/2011 |
| WO | 2011103324 | 8/2011 |
| WO | 2011103328 | 8/2011 |
| WO | 2012079012 | 9/2012 |
| WO | 2012118548 | 9/2012 |

* cited by examiner

SMART MATERIAL ACTUATOR CAPABLE OF OPERATING IN THREE DIMENSIONS

This application claims priority to provisional application 61/305,345 which is incorporated herein by reference.

BACKGROUND

The present invention relates to an actuator capable of operating in three dimensions, having more than two actuating arms and being driven by a piezo or other smart material device, and which may be adapted for use as an actuator, an energy capture device, or a sensor. In certain embodiments, the smart material actuator can also operate as the driver for an audio speaker.

Smart material actuators are known in the art. However, such actuators have one or two actuating arms. Known actuators have limited applications as the actuator-driven arms are intended to move in a single plane and are not well adapted to applications such as grapplers that require compression on multiple planes or in applications where motion in a plane orthogonal to that of the arms is desired. The present invention overcomes such limitations by providing an actuator with more than two arms in which the arms move in independent planes but are operated by a common smart material device. The result is an actuator apparatus that is not only adaptable for use in applications for which one-arm or two-arm smart material actuators were not suitable and which also can be more efficient than one- or two-arm actuators in terms of work output.

A further objective of the present invention is to provide an actuator apparatus capable of operation at high frequencies. Known smart material actuators tend to fail when operated at very high frequencies of repeated activation and deactivation. One reason for such failures is that the actuating arms tend to overextend during high speed operation and especially when operating at resonant frequencies. Certain embodiments of the actuator of the present invention, however, are designed to overcome such limitations both by reducing the weight of the actuating arms and by providing dampeners adapted to prevent such overextensions without hindering high speed operation. The result is a multi-arm actuator capable of operation at very high frequencies, including, without limitation, embodiments capable of operating at frequencies that allow the actuator to serve as a driver of an efficient audio speaker.

A still further objective of the present invention is to provide a smart material actuator capable of being operated with actuating arms at a variety of angles. Allowing use of actuating arms of varying angles allows for great flexibility as arm angles can be selected to meet physical constraints imposed by differing applications. At the same time, it is disclosed that certain ranges of arm angles result in more efficient operation than others in terms of actuator work output. Accordingly, by providing an actuator apparatus capable of use with multiple arm angles, it becomes possible to optimize efficiency by adjusting arm angles.

In addition, the present invention is adapted such that common components can be utilized to assemble actuators of several configurations. This allows for flexibility and efficiency in manufacturing, as common components may be manufactured in bulk and then assembled in wide range of configurations adapted to different applications.

SUMMARY

The present invention provides an actuator driven by a smart material device and having more than two actuating arms. The actuator apparatus comprises a smart material device, a compensator, a movable supporting member, at least three mechanical webs, and at least three actuating arms. The compensator has a first mounting surface, and the mechanical webs have a first compliant member attached to the compensator and a second compliant member attached to said movable supporting member. The movable supporting member has a second mounting surface opposed and substantially parallel to the first mounting surface, and a smart material or piezo device is affixed therebetween. Each actuating arm has a first actuating arm end attached to one mechanical web and an opposed second actuating arm end. The mechanical webs are spaced around the movable supporting member.

The piezo or other smart material device will change shape upon application of a suitable electric potential, thereby providing the motive force for the actuator. More specifically, upon application of a suitable electrical potential, the smart material device will expand, and will do so substantially without angular movement of the smart material device. The expansion urges the movable supporting member away from the first mounting surface and causes said compliant members to flex. The flexing of the compliant members, in turn, urge the actuating arms to move such that motion of the second actuating arm end is across a distance greater than the expansion of said smart material device as a result of the mechanical amplification of the assembly.

Embodiments of the present invention may be adapted to operate as an energy capture device in which movement of the actuating arms compresses the smart material device, thereby generating electrical current. Other embodiments may be adapted to be used as a sensor in which the signal generated by the arm movement senses the motion of the arms. In still further embodiments, the second actuating arm ends may be attached to the outside perimeter of a speaker cone, with the compensator attached to the center. In this form, the actuator may operate as a speaker driver.

BRIEF DESCRIPTION OF THE DRAWINGS

Other objectives and features of the present invention will become apparent from the attached drawings, which illustrate certain preferred embodiments of the apparatus of this invention, wherein.

DETAILED DESCRIPTION

Figure 1:
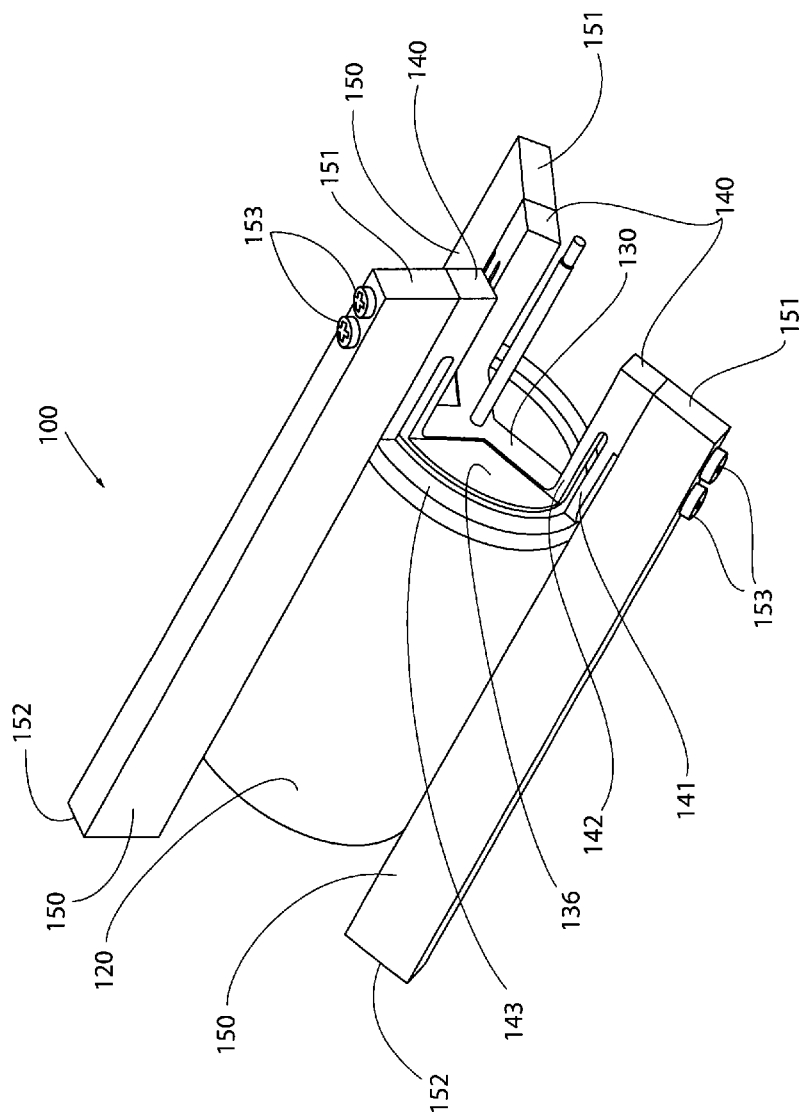
FIG. 1 is a perspective view of an embodiment of the actuator of the present invention having three actuating arms configured at a zero degree angle with respect to the smart material device within the compensator.

While the following describes preferred embodiments of this invention with reference to the included figures, it is to be understood that this description is to be considered only as illustrative of the principles of the invention and is not to be limitative thereof, as numerous other variations, all within the scope of the invention, will readily occur to others in light of the disclosure in this detailed description.

Herein, it will also be understood that various embodiments of the present invention may be utilized as an actuator (in which motion is generated by the application of an electrical potential), as an energy capture device (in which motion is converted to electrical energy), or as a sensor (in which changes in the positions of the actuating arms or compensator are converted into electrical signals indicating the degree of such change). Accordingly, herein, the term "actuator" refers to the smart material apparatus of the present invention without limiting such apparatus to a particular use as an actuating, energy capture, or sensing device.

It will also be noted that in the illustrated embodiments, different embodiments comprise the same or similar components. Where the same component is suitable for use in different embodiments, the same reference number is used. For example, and without limitation, actuating arm 150 is illustrated as a common component that may be used in embodiments including 100, 100', 200 and 500. Accordingly, the same number is used to indicate the common part used in the illustration of each assembly. Where components in different embodiments are similar variations of the same component, but are not common parts, a similar number is used, but with a differing initial first, or in the case of four-digit numbers, first and second digits, but common second and third digits. For example, and without limitation, mechanical webs 140, 240, and 340 each are examples of mechanical webs with similar structures adapted for use in different embodiments of the apparatus of the present invention, but need not be interchangeable parts. Finally, it will be noted that letters are used herein to designate axes defined by two points through which the axis runs. Designations such as $\alpha$, and $\beta$, are used to indicate angles between such axes in order to describe preferred angles appropriate for use in various embodiments described herein.

GLOSSARY

Herein, the following terms shall have the following meanings:

The term "adapted" shall mean sized, shaped, configured, dimensioned, oriented and arranged as appropriate.

The term "smart material device" shall mean: a device comprising a piezoelectric material that expands when an electric potential is applied, or generates an electric charge when mechanical force is applied. Smart material devices include, without limitation, devices formed of alternating layers of ceramic piezoelectric material fired together (a so-called co-fired multilayer ceramic piezoelectric stack such as those available from suppliers including NEC) or a device formed of one or more layers of material cut from single crystal piezoelectric materials. In the foregoing, the term "piezoelectric material" also includes so-called "smart materials," sometimes created by doping known piezoelectric materials to change their electrical or mechanical properties.

The term "mechanical web" shall mean a structure comprising two compliant members and being adapted to translate motion to an actuating arm.

The term "activation" when used in conjunction with "actuator" or "smart material device" means application of an electrical potential and current suitable to cause the smart material device to expand in an amount sufficient to flex the compliant members of at least one mechanical web.

The term "ring" means a closed shape with a continuous perimeter, and is not limited to only circular, ovoid, or other particular shapes.

The definitions and meanings of other terms herein shall be apparent from the following description, the figures, and the context in which the terms are used.

DESCRIPTION OF PREFERRED EMBODIMENTS

Figure 2:
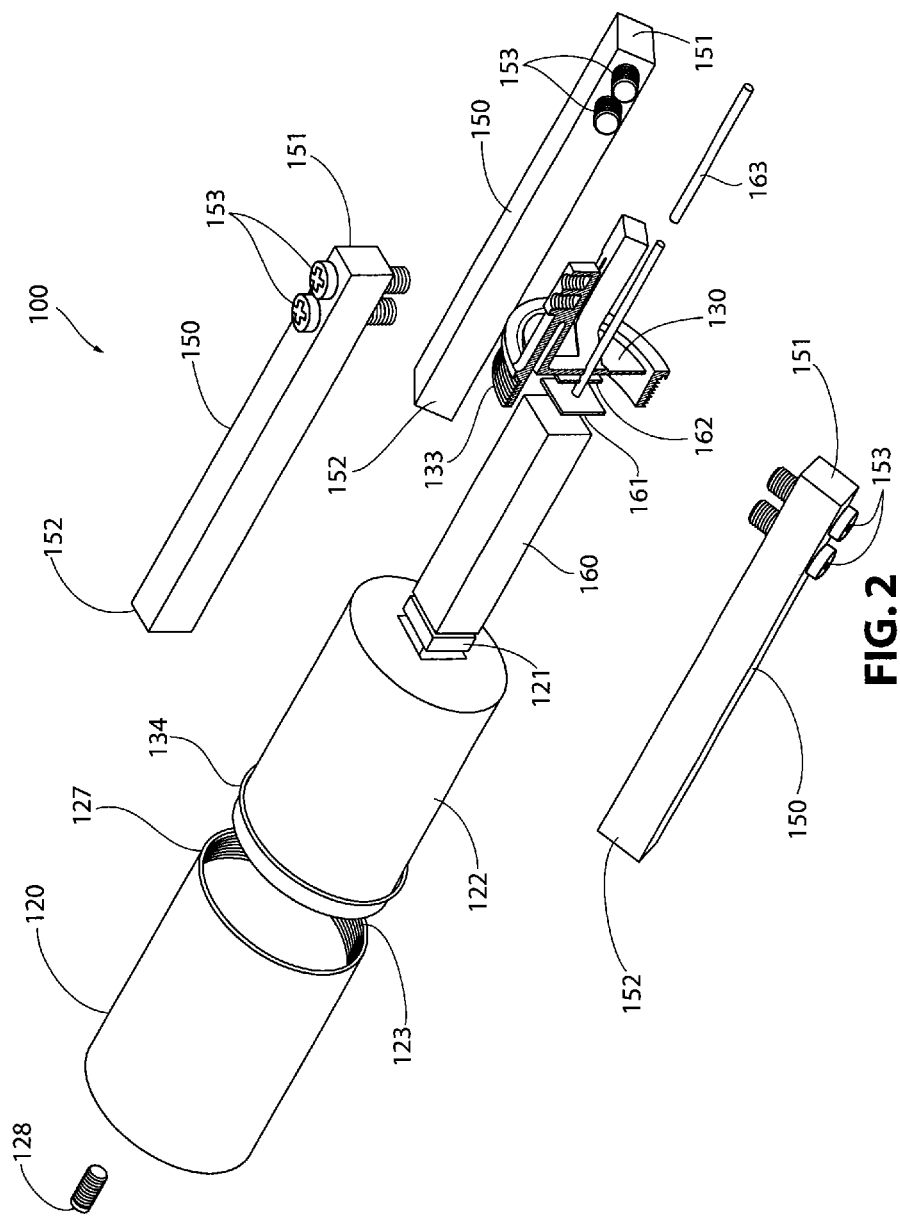
FIG. 2 is an exploded, perspective view of the embodiment illustrated in FIG. 1.

FIGS. 1 and 2 illustrate assembled and exploded views of an embodiment of an actuator assembly 100 of the present invention having three actuating arms 150. Actuator assembly 100 comprises a smart material device 160, a compensator 120, a movable supporting member 130, at least three mechanical webs 140, and three actuating arms 150. As will be discussed below, embodiments with more than three actuating arms 150 are also possible.

Compensator 120 has a first mounting surface 121 adapted to receive one end of smart material device 160. The first mounting surface 121 may be integral to compensator 120, for example in the form of an indentation (not illustrated), or may be in the form of a separate pad situated between compensator 120 and smart material device 160. In the embodiments illustrated, smart material device 160 is assumed to comprise conductors at either end (not illustrated). When such smart material devices 160 are utilized, first mounting surface 121 and compensator 120 may be formed of conductive materials such as aluminum, steel, stainless steel or Invar, thereby allowing compensator 120 to act as a convenient connection point for an electrical ground for smart material device 160.

Smart material device 160 may be a stack of piezo-electric, or other smart material, or may be a single piezoelectric crystal. A key feature of smart material device 160 is that it will change shape, and in particular will expand to increased length, upon application of a suitable electric potential. While the size and particular smart material used may vary according to application, smart material devices from manufacturers including NEC-Tokin (including without limitation part numbers AE0707D43H33, and AE0505D44), EPCOS (including without limitation part numbers LN04/8534, LN04/8671, LN04/8672) Ceramtec, and Kyocera are suitable for embodiments of actuators of the present invention.

Smart material device 160 is situated between first mounting surface 121 and movable supporting member 130, which comprises second mounting surface 131. Movable supporting member 130 may be formed from a variety of materials including, without limitation stainless steel, steel, aluminum, ceramics or carbon fiber. Where a conductive material is used, it is desirable to include electrode 161 and first insulator 162 between smart material device 160 and movable supporting member 130. Electrode 161 may conveniently pass through movable supporting member 130, with second insulator 163 providing further insulation where electrode 161 passes through movable supporting member 130. Because smart material device 160 expands and contracts according to the application of an electric potential, it is desirable that first insulator 162 be formed of a rigid material, which may conveniently be a ceramic material, varieties of which are known to those of skill in the art. In this way, the expansion and contraction of smart material device 160 will be more fully imparted to movable supporting member 130 with less loss due to the compression and expansion of first insulator 162. Because movable supporting member 130 may move upon expansion and contraction of smart material device 160, it is also desirable that, where a tight tolerance is used between electrode 161 and movable supporting member 130, second insulator 163 comprises a low-friction material such as Teflon that will reduce friction and heat as movable supporting member 130 moves, while still providing electrical insulation.

It will be understood by those of skill in the art, that the foregoing describes only one possible arrangement of positive and negative electrodes and that many other arrangements, are possible depending on the location of the terminals on smart material device 160, and include, without limitation, insulating compensator 120 such that it may serve as a ground while movable supporting member 130 serves as a positive terminal without the benefit of electrode 161 or insulators 162, 163, or simply providing wired connections (not illustrated) between side terminals (not illustrated) on smart material device 160, running through compensator 120 or movable supporting member 130 to terminals.

As noted above, movable supporting member 130 comprises a second mounting surface 131. Second mounting surface 131 is opposed and substantially parallel to first mounting surface 121. This is desirable as it allows smart material device 160 to be compressed between first mounting surface 121 and second mounting surface 131, without generating significant angular forces on smart material device 160. Preventing angular movement of smart material device 160 has been found helpful in increasing the operational life of smart material device 160. Additionally, pre-compressing, or "preloading" smart material device 160 has been found helpful in increasing the efficiency of smart material device 160 and, in turn, actuator apparatus 100. As illustrated in FIG. 2, one means of providing such a pre-load is through preload screw 128, which engages first mounting surface 121. Tightening preload screw 128 increases preload, while loosening preload screw 128 reduces preload.

Figure 3:
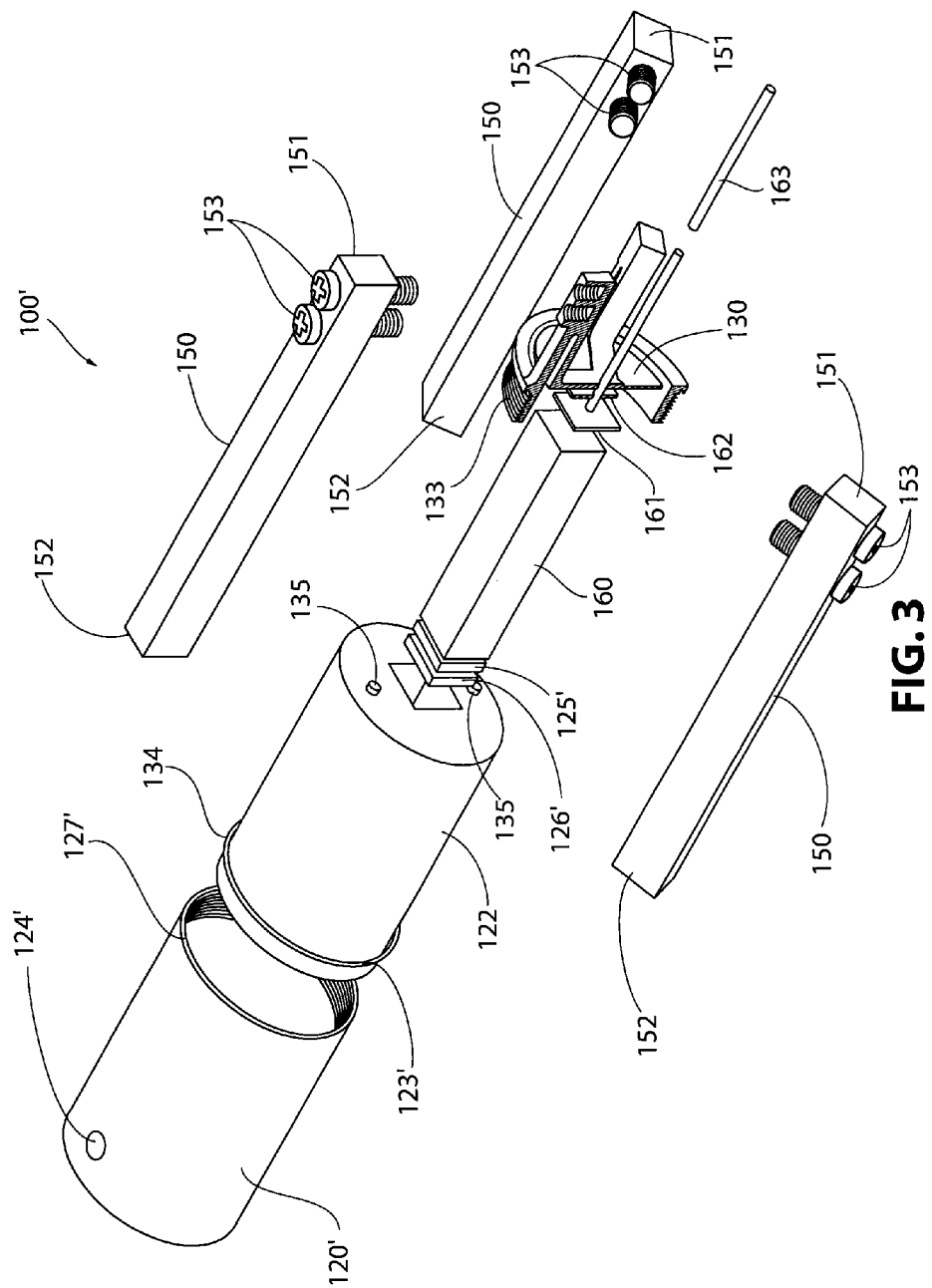
FIG. 3 is an exploded, perspective view of an alternate embodiment of the actuator of the present invention, having three arms, but not including a preload screw.

An alternate means of preloading smart material device 160 is illustrated in FIG. 3, in which actuator assembly 100' utilizes compensator 120', but does not utilize a preload screw. Instead, actuator assembly 100' further comprises a continuous ring 143, illustrated in FIG. 4, and attached to first compliant members 141. Compensator 120' has a first open compensator end 127'. Ring 143 and first open compensator end 127' comprise generally helical threads 123' and 133 adapted to allow compensator 120' to thread onto ring 143. It will be understood by those of skill in the art that other means of attaching open compensator end 127' to ring 143 may also be utilized. For example, compensator 120' may conveniently comprise a flange (not illustrated) and mechanical fasteners (not illustrated) or welds (not illustrated) could be used to secure that flange to ring 143. Alternatively, pins (not illustrated) could be inserted through four or more holes (not illustrated) in compensator 120' and through matching holes in ring 143 (not illustrated). A further alternative attachment means would comprise bolts (not illustrated) or similar fasteners (not illustrated) inserted lengthwise through the end of compensator 120' opposed to first open compensator end 127' and into ring 143. A still further alternative means would comprise a ratcheting system whereby matching teeth (not illustrated) on first open compensator end 127' and ring 143 are adapted to engage such that compensator 120' may be pressed onto ring 143 comparatively easily but, once engaged, said teeth resist removal of compensator 120' Other attachment means will also be apparent to those of skill in the art in light of this description, all of which are encompassed in the present invention.

Where no preload device is used, each such means, however, preferably has the characteristic that tightening said means increases the level of preload applied to smart material device 160, thereby allowing preload to be adjusted by tightening and loosening compensator 120'. All such means, however, should be adapted such that ring 143 remains joined to compensator 120' upon activation of smart material device 160.

In embodiments in which matching threads 123' and 133 are utilized, compensator 120' may conveniently be in the form of a canister and ring 143 may conveniently be circular. However, it will be understood that other shapes may be utilized for compensator 120' and ring 143, including, without limitation, rectangular, ovoid or multi-sided shapes, depending on the attachment means selected. Where threads 123' and 133 are utilized, however, compensator 120' is attached to ring 143 with a turning or screwing motion. As it is desirable that smart material device 160 align properly and not twist, it is desirable in such embodiments to include at least one, and preferably two thrust pads 125' and 126' adapted to allow compensator 120' to turn and compress smart material device 160 without twisting it. By forming thrust pads 125' and 126' from materials with low coefficients of friction, one may turn against the other without requiring smart material device 160 to twist at the same time. Additionally, in such embodiments, second mounting surface 131 may comprise means to prevent smart material device 160 from twisting upon assembly. One such means to prevent twisting comprises indentations 134 in second mounting surface 131 adapted to receive pins 135 incorporated into potting material 122. As potting material 122 preferably tightly encapsulates smart material device 160, preventing rotation of potting material 122 can, in turn, act to prevent rotation of smart material device 160. Other means to prevent rotation of smart material device 160 may also be used including, without limitation, adhesives (not illustrated), forming an indentation (not illustrated) on second mounting surface 131 adapted to receive square or rectangular embodiments of smart material device 160, forming protrusions (not illustrated) in second mounting surface 131 adapted to be received by indentations (not illustrated) in potting material 122, and forming surfaces (not illustrated) on second mounting surface 131 adapted to engage one or more surfaces on smart material device 160 and, thereby, resist rotation. Other appropriate means of preventing rotation will be apparent to those of skill in the art in light of this description.

Preferably thrust pads 125' and 126' will be conductive, thereby allowing compensator 120' to be electrically connected to smart material device 160. Otherwise, other means (not illustrated) of forming an electrical connection with smart material device 160 may be used including, without limitation electrodes (not illustrated) similar to electrode 161 adapted to extend through thrust pads 125' and 126', or providing a wired connection (not illustrated) to a side terminal (not illustrated) on smart material device 160.

In this manner, smart material device 160, compensator 120', threads 123' and 133, first thrust pad 125' and said second thrust pad 126', and second mounting surface 131 may be adapted such that when said first compensator attachment means (in this case threads 123') and said second compensator attachment means (in this case threads 133) are fully engaged, smart material device 160 is compressed between first mounting surface (in this case first thrust pad 125') and said second mounting surface 131, thereby applying a predetermined preload on smart material device 160. For embodiments in which twisting of compensator 120' is not needed during assembly, thrust pads 125' and 126' are not required and the same preload effect may be achieved without them.

In certain environments, it is desirable that smart material device 160 be protected from environmental contaminants. This may preferably be accomplished by including potting material 122 contained in compensator 120, 120' which is preferably substantially in the form of a canister. The potting material 122, several examples of which are known to those of skill in the art, will preferably substantially fill the space between compensator 120, 120' and smart material device 160. In this way, compensator 120, 120', ring 143, and potting material 122 may be adapted such that, substantially upon full engagement of threads 123 or 123' and 133 (or other connection means as appropriate), smart material device 160 is substantially sealed and substantially protected from external humidity, moisture and contamination. O-ring 134 may be utilized to improve the seal if desired. As is discussed further below, it will be noted that ring 143 is connected to movable supporting member 130 by compliant members 141, 142, thus leaving a gap between movable supporting member 130 and ring 143. For improved protection, it is preferred that potting material 122 be adapted to cover such gap.

Figure 4A:
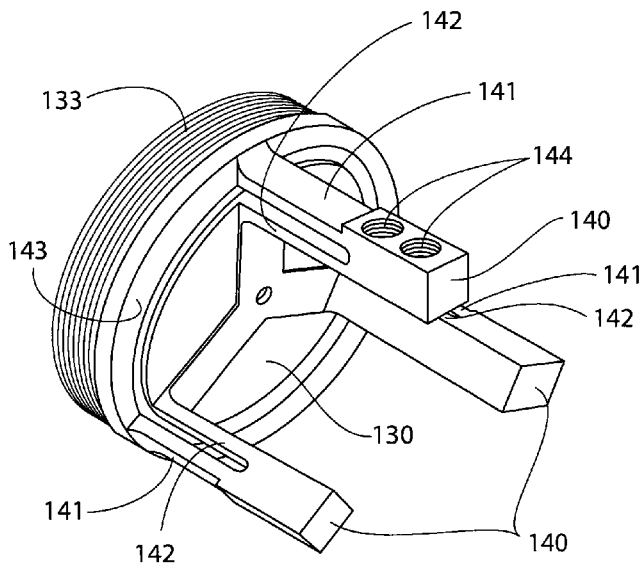
FIG. 4 is a perspective view of the mechanical webs, ring, and movable supporting member of the embodiments illustrated in FIGS. 1-3.
Figure 4B:
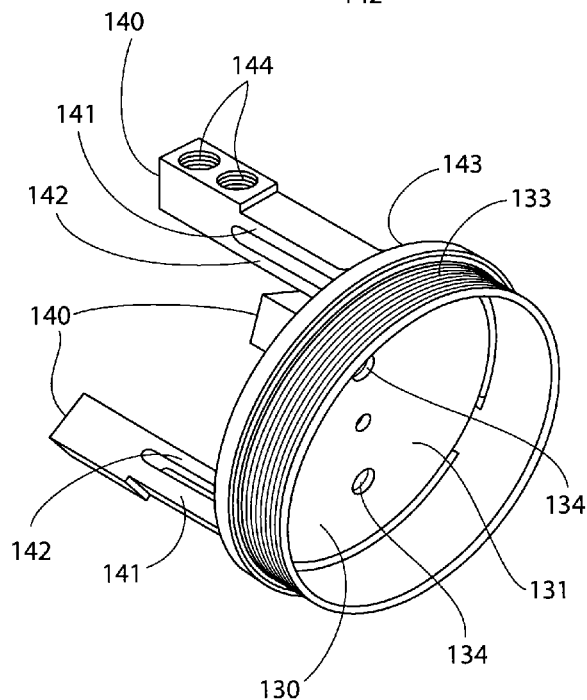

As shown in FIG. 4, movable supporting member 130 is attached to mechanical webs 140, which comprise a first compliant member 141 attached to compensator 120 through ring 143, and a second compliant member 142 attached movable supporting member 130. Mechanical webs 140 are adapted to flex upon movement of movable supporting member 130 and may conveniently be formed of a variety of resilient materials including, without limitation spring steel, steel, titanium, stainless steel, aluminum, or carbon fiber. The thickness and length of compliant members 141 and 142 will vary depending on the application for which actuator assembly 100 is adapted. For example, where greater stroke length is needed, thinner and longer compliant members 141 and 142 are preferred, as thinner, longer compliant members 141, 142 result in a higher overall motion of the actuating arms.

It is through the flexing of compliant members 141, 142 that energy is transferred to and from smart material device 160. In particular, application of an electrical potential will cause smart material device 160 to expand substantially without angular movement. Preventing angular movement of smart material device 160 is desirable as it tends to increase the operational life of smart material device 160. The expansion thereby urges movable supporting member 130 away from first mounting surface 121 and causes compliant members 141 and 142 to flex. Flexing occurs because compliant members 141 are attached to ring 143 which is held in place to compensator 120, 120' as smart material device 160 expands and movable supporting member 130 moves. The flexing of compliant members 141, 142 moves actuating arms 150, and, in particular causes second actuating arm end 152 to move across a distance greater than the expansion smart material device 160. In this way, mechanical webs 140, movable supporting member 130, ring 143 and actuating arms 150 act as a mechanical amplifier, translating a relatively modest expansion of smart material device 160 into a greater degree of motion at second actuating arm ends 152.

In most applications, it is preferred that actuating arms 150 are each of substantially the same length and that the spacing of mechanical webs 140 around movable supporting member 130 is substantially even such that the distance between each two adjacent mechanical webs 140 is substantially identical. In this way, actuating arms 150 are spaced evenly and radially about smart material device 160 in a substantially cylindrical configuration, and mechanical webs 140 are adapted such that substantially upon flexing of compliant members 141, 142, second actuating arm ends 152 move toward smart material device 160. It will be understood that the term cylindrical configuration is intended herein to include both cylindrical configurations in which actuating arms 150 are in line with smart material device 160 and conical configurations in which actuating arms are at an angle with respect to smart material device 160, as is discussed further below. By adapting actuating arms 150 to be of a consistent length, and substantially evenly spacing mechanical webs 140 around movable supporting member 130, the operational life of smart material device 160 may be improved as each actuating arm 150 and mechanical web 140 will typically move evenly, thereby reducing the likelihood of twisting or deflecting smart material device 160, which may become more likely if one actuating arm 150 is subjected to substantially different levels of stress than are other actuating arms 150.

Actuating arms 150 are preferably attached to mechanical webs 140 at first actuating arm end 151. Any variety of attachment means will be readily apparent to those of skill in the art in light of this description, including, without limitation, press-fitting, welding, use of adhesives or epoxies, or forming actuating arms 150 integral to mechanical webs 140. One convenient means of removably attaching actuating arms 150 to mechanical webs 140 is illustrated in the figures and comprises the use of mechanical fasteners 153 passing through actuating arms 150 and into threaded receptacles 144 in mechanical webs 140. An advantage of actuating arms being removably attached is that it allows for use of actuating arms 150 in different lengths and of different materials than mechanical webs 140, thereby making it easier to adapt a given actuator assembly 100, 100' to different uses. While a variety of materials may be utilized for actuating arms 150, carbon fiber, stainless steel, steel, aluminum, ceramic and rigid plastics are may all be suitable choices depending on the application. Carbon fiber has been found to be particularly suitable where a high-strength, light-weight actuating arm 150 is needed. Light-weight actuating arms 150 are particularly desirable when high speed actuators are needed as lowering the weight of the actuating arm tends to increase the resonant frequency of actuator assembly 100. Where actuator assembly 100 is used as an actuator that converts electrical energy into mechanical motion, second actuating arm ends 152 may be attached to the external structure (for example and without limitation a valve stem, pump, compressor or switch) to be actuated. Such attachment may be made by any of a wide variety of attachment means apparent to those of skill in the art including, without limitation mechanical fasteners (not illustrated in FIGS. 1, 2), welds (not illustrated), and adhesives or epoxies (not illustrated). Where actuator assembly 100 is to be utilized as an energy capture device suitable for converting mechanical motion to electrical energy, second actuating arm ends 152 may be attached to a source of mechanical motion or vibration (not illustrated in FIGS. 1, 2) via similar means. Alternatively, where actuator apparatus 100 is to be utilized as a sensor adapted to indicate a degree of movement, second actuating arm ends 152 may be attached to source of such movement (not illustrated in FIGS. 1, 2) by similar means.

Figure 5:
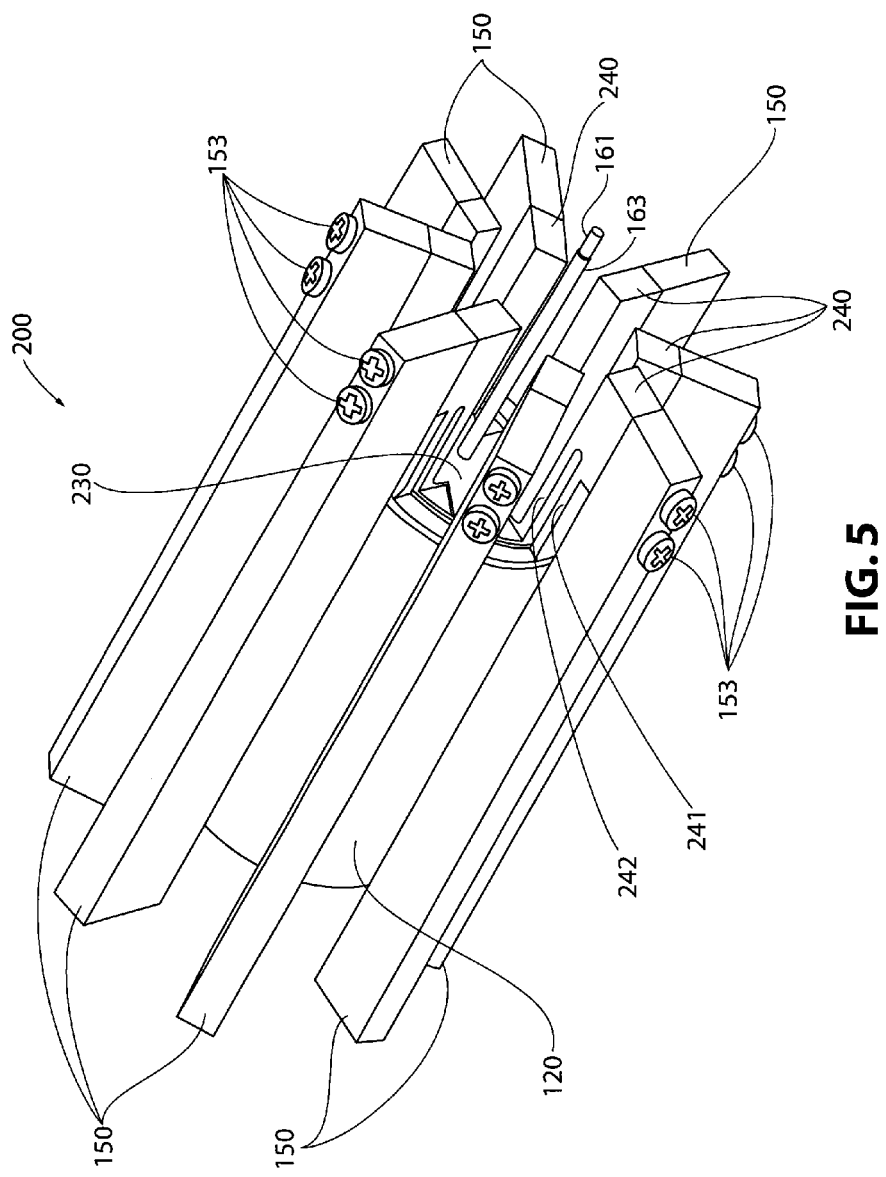
FIG. 5 is a perspective view of an embodiment of the actuator of the present invention having eight actuating arms configured at a zero degree angle with respect to the smart material device within the compensator.

The embodiments illustrated in FIGS. 1-4 have three removably attached actuating arms 150. The present invention, however, is not limited to three arm embodiments. Alternate embodiments of the actuator of the present invention may include virtually any number of actuating arms 150 and actuating arms of other configurations. FIG. 5 illustrates one such embodiment, having eight actuating arms 150, while FIGS. 6-15 illustrate four-arm embodiments 300, 400, 500, 600, 700, 800, 900, and 1000, some of which utilize actuating arms other than actuating arms 150. As illustrated in FIG. 5, actuating arms 150 and compensator 120 (or if desired 120'), as well as the internal components of the actuator assembly, are the same as the embodiments previously described. Mechanical webs 240 and movable supporting member 230 are also substantially similar in configuration and operation to mechanical webs 140 and movable supporting member 130 previously described, but are adapted for the desired number of actuating arms 150. The primary differences are thus in the number of mechanical webs 240 in the case of FIG. 5 eight actuating arms, and the fact that mechanical webs 240 are spaced more closely together to accommodate their larger number. In this way it will be understood that actuators according to the current invention of virtually any number of arms may be created, each of which having substantially the same internal components and each operating according to the principles described.

Figure 6:
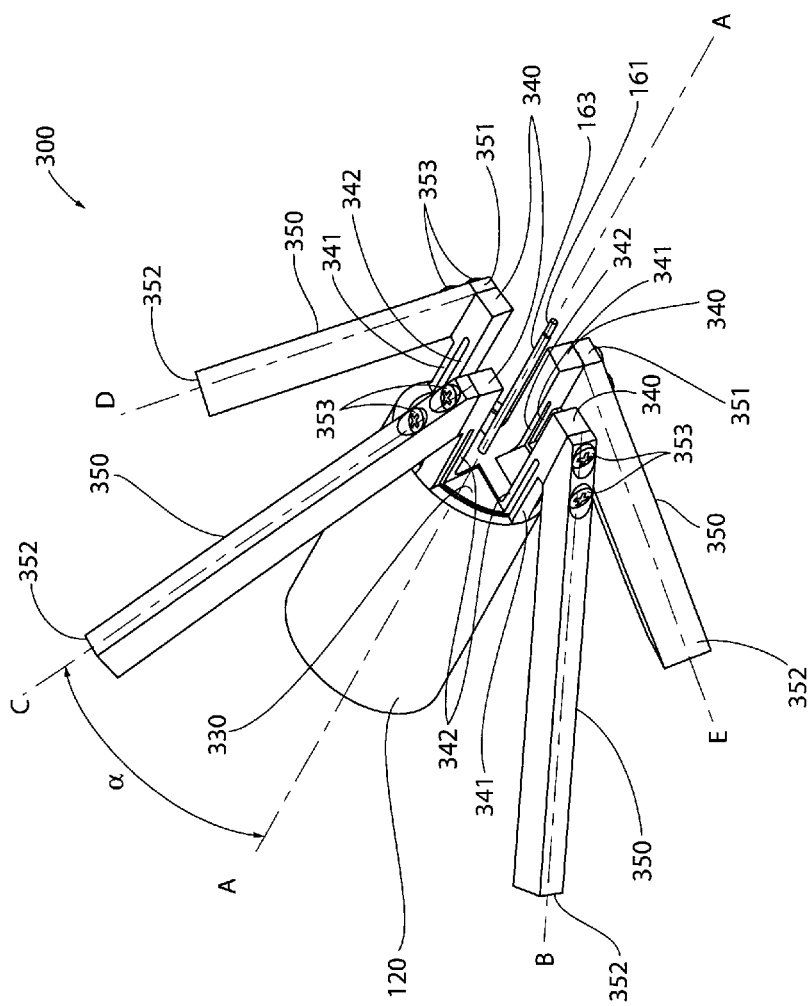
FIG. 6 is a perspective view of an embodiment of the actuator of the present invention having four actuating arms configured at approximately a fifty degree angle with respect to the smart material device within the compensator.

The angles of the actuating arms may also be varied in different embodiments. FIG. 6 illustrates one such embodiment in which actuating arms 350 are angled away from compensator 120. To illustrate the relative angles, a central axis A is illustrated as running through the center of smart material device 160 (within compensator 120) and extending through first mounting surface 121 and through second mounting surface 131 (not illustrated). As illustrated, central axis A extends through the center of electrode 161 and the center of compensator 120. For each actuating arm 350, actuating arm axes B, C, D, E extend through first actuating arm end 351 and second actuating arm end 352. The angle between central axis A and each of actuating arm axes B, C, D, E may thus be measured, and shall be referred to herein as angle α. Preferably, each angle α will be substantially identical. Accordingly, only one such angle α is illustrated in FIG. 6 and, as shown, is approximately fifty degrees in that embodiment.

Figure 7:
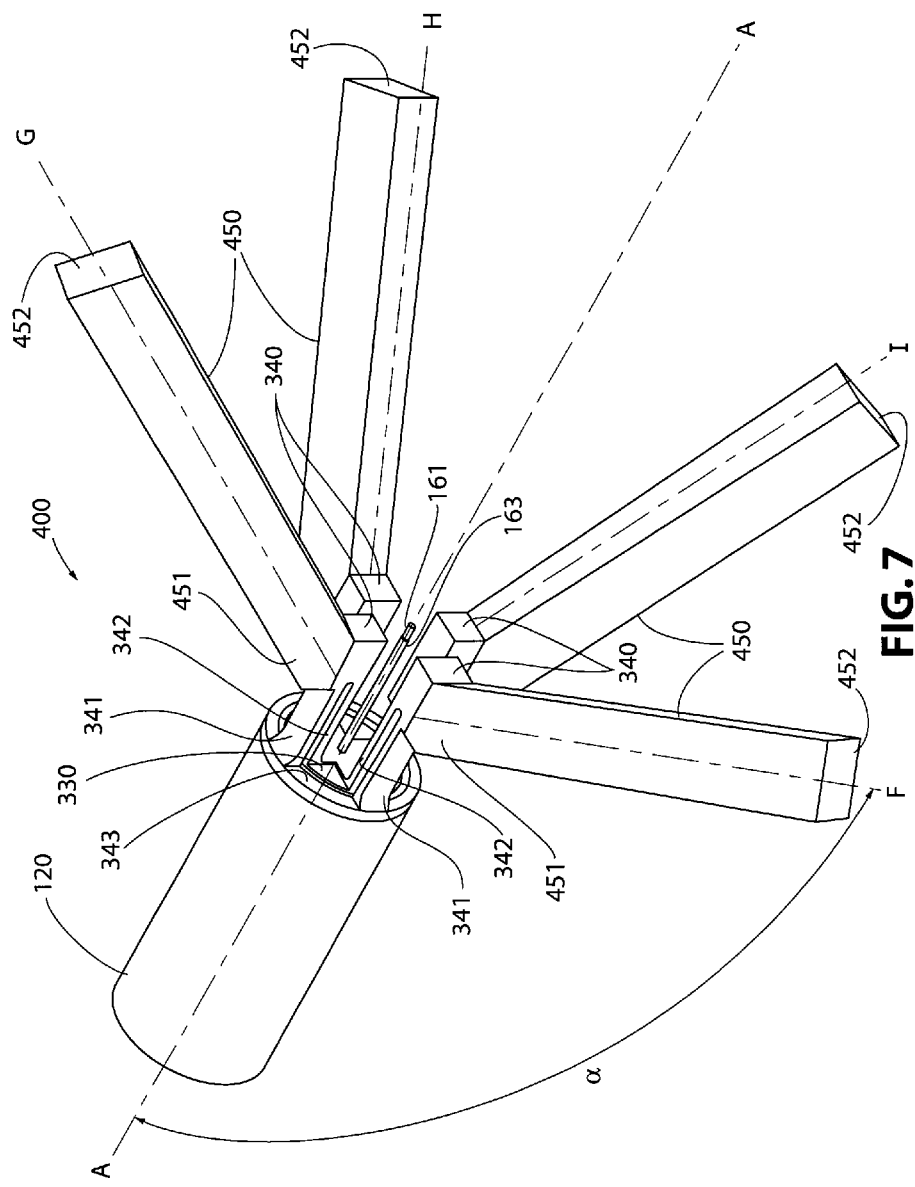
FIG. 7 is a perspective view of an embodiment of the actuator of the present invention having four actuating arms configured at approximately a one hundred thirty-five degree angle with respect to the smart material device within the compensator.
Figure 8:
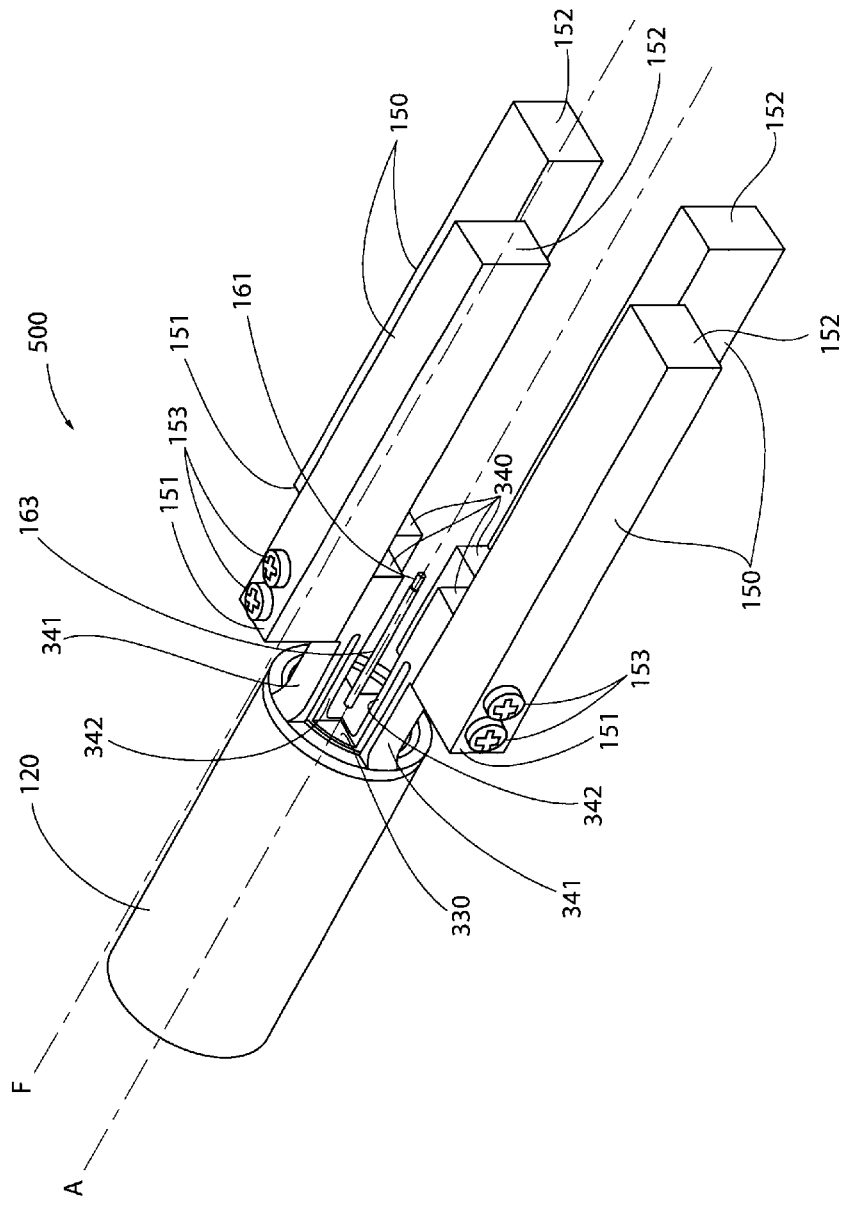
FIG. 8 is a perspective view of an embodiment of the actuator of the present invention having four actuating arms configured at approximately a one hundred eighty degree angle with respect to the smart material device within the compensator.

As illustrated, angle α may conveniently be determined by adaptation of the attachment between actuating arm 350 and mechanical web 340. In this way, different configurations of removably attachable actuating arms 150 may be used to achieve different angles α. Alternatively different embodiments of mechanical webs (not illustrated), each adapted to for different angles α may be used, thereby enabling straight actuating arms 150 to be used. Several such arrangements will be apparent to those of skill in the art in light of this description, including incorporating an angled surface onto mechanical web 140. By way of example, FIG. 7 illustrates an embodiment of the actuator assembly 400 of the present invention in which actuating arms 450, and in particular first actuating arm ends 451, are adapted such that angle α is greater than ninety degrees. As shown, actuating arm axes F, G, H, and I each extend through first actuating arm end 451 and second actuating arm end 452, with angle α being the angle between each actuating arm axes F, G, H, I and central axis A. As in the previously described embodiment, angle α is preferably substantially identical for each actuating arm axis and, as shown in the embodiment illustrated in FIG. 7 is approximately one hundred thirty-five degrees. It will be understood that when angle α is greater than ninety degrees (as shown in FIG. 7), second actuating arm ends 452 move apart substantially upon application of a suitable electric potential to smart material device 160 (inside compensator 120). Where angle α is less than ninety degrees (as shown in FIG. 6), second actuating arm ends 352 move together substantially upon application of a suitable electric potential to smart material device 160 (inside compensator 120). FIG. 8 shows another embodiment of the actuator of the present invention in which actuating arms 150 are reversed to face directly backwards and are arranged to be substantially parallel to central axis A. In such a configuration, angle α may be said to be one hundred eighty degrees. Accordingly, it will be understood that angles α for actuators according to the present invention may conveniently range from zero to one hundred and eighty degrees. In embodiments in which compensators 120, 120' are small, or actuating arms (not illustrated) are angled or curved, angles α of less than zero may also be used if desired.

It is disclosed herein, however, that the efficiency of smart material device 160 and, in turn actuator assemblies 100, 100', 200, 300, 400, 500, 600, may be affected by angle α and the lengths of actuating arms 350. Tables 1 and 2 illustrate sample relationships for actuator when two different arm lengths are utilized. In each, second actuating arm end 352 is affixed to a supporting structure. In the case of longer actuating arms 352, a significant increase in total work is seen when angle α is approximately 87°. In the case where actuating arms 352 are shorter, however, maximum work occurs when angle α is approximately 83°. As indicated the difference in total work output can fall off significantly when less than optimal angles α are utilized. Accordingly, where maximum efficiency is needed, the optimal angle α may be calculated for given actuator assembly embodiments having set actuating arm lengths and mechanical web configurations.

TABLE 1

Longer Arms

| Angle α | Deflection | Blocking Force | Normalized Work |
|---|---|---|---|
| 83° | 0.03287 | 6.892 | 0.2265 |
| 85° | 0.07390 | 6.725 | 0.4970 |
| 87° | 0.11586 | 6.561 | 0.7602 |
| 89° | 0.06190 | 6.384 | 0.3952 |
| 91° | 0.02710 | 6.195 | 0.1679 |

TABLE 2 shorter Arms

| Angle α | Deflection | Blocking Force | Normalized Work |
|---|---|---|---|
| 75° | 0.01475 | 13.635 | 0.2011 |
| 80° | 0.03918 | 13.366 | 0.5237 |
| 82° | 0.05152 | 13.248 | 0.6825 |
| 83° | 0.05374 | 13.194 | 0.7090 |
| 84° | 0.05180 | 13.140 | 0.6806 |
| 85° | 0.04645 | 13.076 | 0.6074 |
| 86° | 0.03960 | 13.021 | 0.5156 |
| 87° | 0.03276 | 12.960 | 0.4246 |
| 88° | 0.02677 | 12.898 | 0.3453 |

It is further disclosed that, where second actuating arm ends 152, 352, 452 are free to move, and compensator 120, 120' is affixed to a supporting structure, optimal angle α may be different than when second actuating arm ends 152, 352, 452 are affixed to a supporting structure and compensator 120, 120' is free to move. In particular, in embodiments in which said second actuating arm ends 152, 352, 452 are adapted to attach to a supporting structure, preferred ranges of angle α are either at least forty five and at most eighty-nine degrees, or at least ninety one and at most one hundred thirty-five degrees. Alternatively, in embodiments in which said second actuating arm ends 152, 352, 452 are free to move and compensator 120, 120' further comprises a means to attach to a supporting structure, preferred ranges of angle α are either at most fifty degrees, or between at least one hundred thirty degrees and at most one hundred eighty degrees. As is noted above, second actuating arms 152, 352, 452 may be adapted to affix to a supporting structure with a variety of mechanical fasteners (not illustrated) known in the art. Similarly, means to attach compensator 120, 120' to a supporting structure may include mechanical fasteners including without limitation fasteners 883, 983 illustrated in FIGS. 13-14, or any variety of other fasteners, strap arrangements, or other affixing means known to those of skill in the art.

Figure 9:
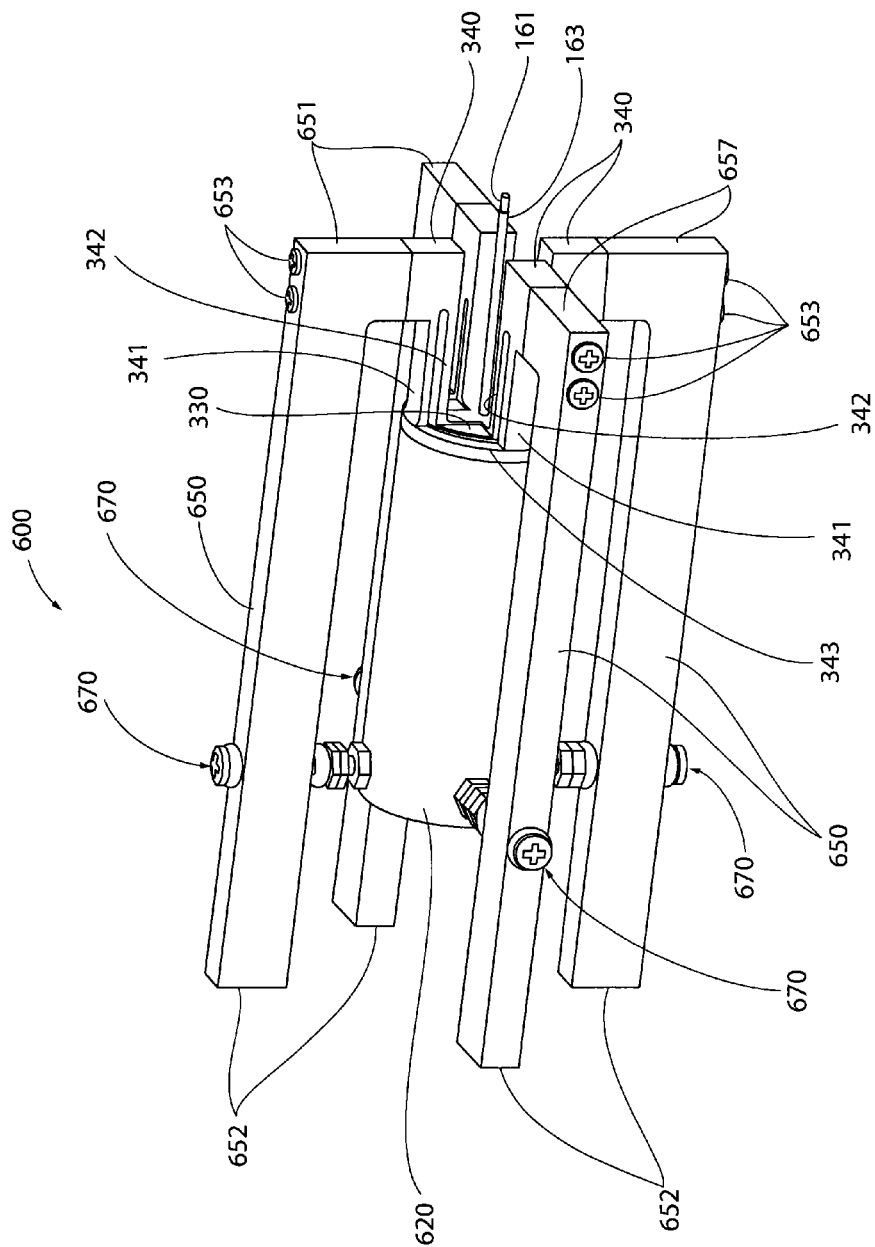
FIG. 9 is a perspective view of an embodiment of the actuator of the present invention having four actuating arms configured at a zero degree angle with respect to the smart material device within the compensator, each actuating arm having a dampener adapted to assist in high speed operation.
Figure 10:
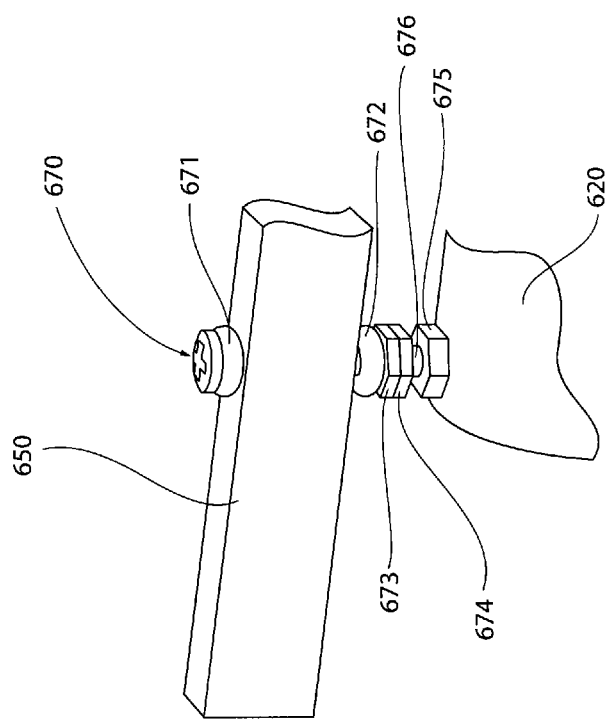
FIG. 10 is a detailed, perspective view of the dampeners illustrated in FIG. 9.

As has already been noted, actuators according to the present invention may be adapted for high-speed operation in which the frequency of repeated activation and deactivation is high. Referring to FIGS. 9 and 10, actuator assembly 600 comprises dampener assemblies 670 attached to compensator 620 and adapted to improve performance during such high-speed operation by acting to limit the motion of actuating arms 650 in either direction. Herein, the term dampener assembly is used to refer to a device having at least one compliant stop and being adapted to limit the motion of actuating arms 650. One preferred embodiment is shown in FIG. 10, in which a threaded fastener 676 is adapted to extend through actuating arm 650 and attach to compensator 620, which preferably comprises a threaded receptacle (not illustrated). First locking nut 675 may conveniently be cinched down on compensator 620 to prevent loosening of fastener 676 during operation. Pliable stops 671 and 672 are on fastener 676 on either side of actuating arm 650 and may conveniently be O rings, or any material (including without limitation urethane, plastic, rubber, or a variety of synthetic materials) adapted to be compliant such that first and second pliable stops 671 and 672 will resist excessive movement of actuating arms 650 preferably without hard stops that would result in ringing. Third locking nut 673 may be positioned to locate first pliable stop 672 and then second locking nut 674 may be cinched against third locking nut 673 to prevent unintended repositioning of second pliable stop 672 during operation. First pliable stop 671 may conveniently be held in position by the head or other end of fastener 676.

It will be understood that the illustrated assembly 670 is but one embodiment of a dampener suitable for use with actuators of the present invention. Other dampener assemblies (not illustrated) may also be used, each preferably including at least one and preferably two pliable stops, each adapted to restrict excess arm movement in one direction. Alternate embodiments of suitable dampeners will be apparent to those of skill in the art in light of this description and the present invention should not be construed to be limited to the illustrated embodiments.

Figure 11:
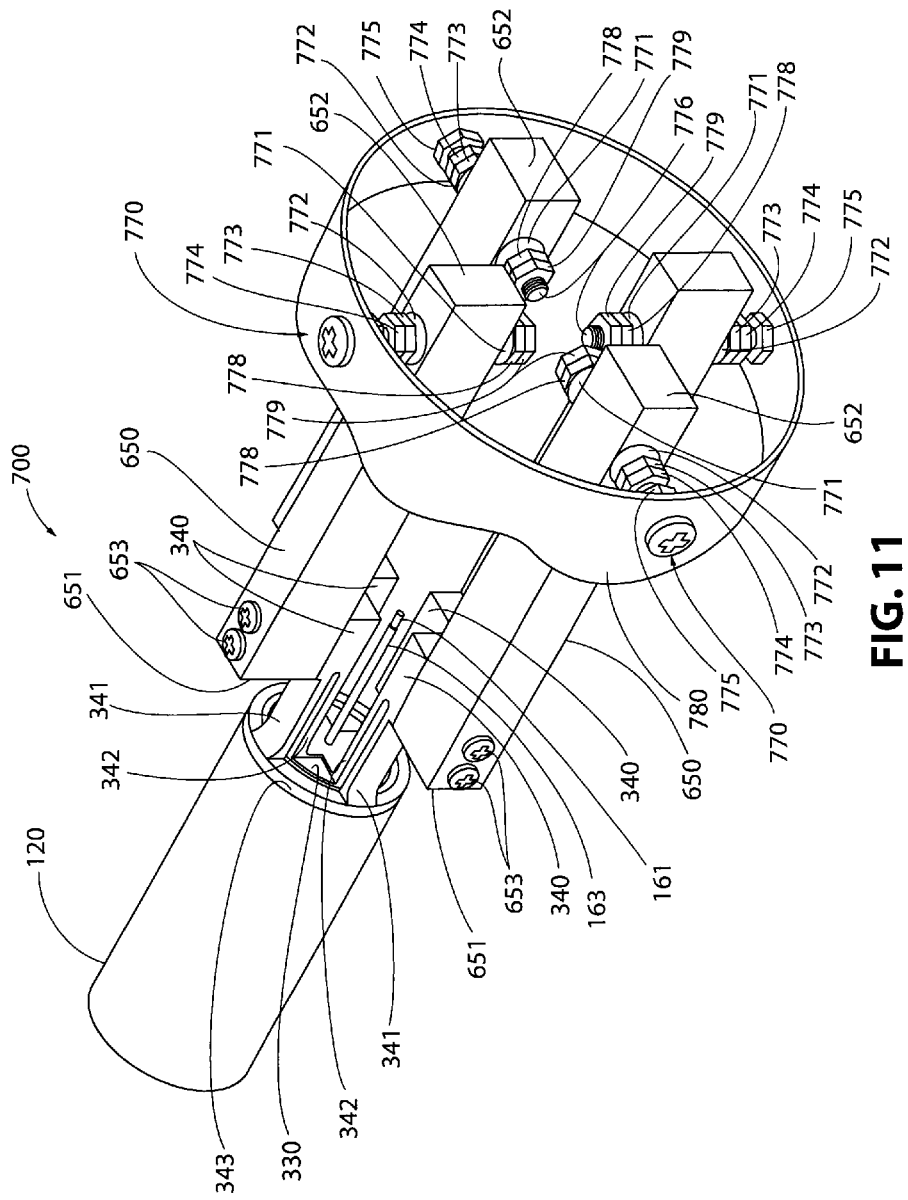
FIG. 11 is a perspective view of an embodiment of the actuator of the present invention having four actuating arms configured at a one hundred eighty degree angle with respect to the smart material device within the compensator, each actuating arm having a dampener attached to an outer yoke and adapted to assist in high speed operation.

An alternate preferred embodiment of dampener assembly, adapted for use with actuator embodiments in which angle α is greater than ninety degrees, is illustrated in FIG. 11. In the illustrated embodiment, actuating arms 650 are reversed such that angle α may be said to be one hundred eighty degrees. Dampener assemblies 770 are attached to dampening yoke 780 and movably attached to actuating arms 650. In the illustrated embodiment, dampener assembly 770 comprises a threaded fastener 776 extending through dampening yoke 780 and through actuating arms 650. First locking nut 775 is cinched down against dampening yoke 780 to resist loosening of dampener assembly 770 during operation. Second pliable stop 772 is positioned by third locking nut 773, which, in turn is held in place by second locking nut 774. As is understood, tightening second locking nut 774 against third locking nut 773 will act to prevent third locking nut 773 from repositioning during operation. First pliable stop 771 is positioned on the opposite side of actuating arm 650 and is similarly positioned by fourth locking nut 778, which is held in place by fifth locking nut 779.

As has been noted, many variations dampeners may be used, and the present invention is not intended to be limited to the preferred embodiments illustrated and described herein. It will further be understood that dampening yoke 780 need not be a dedicated yoke and, instead may be part of a case (not illustrated) encapsulating at least a portion of actuator assembly 700, or may be an external structure (not illustrated) convenient to actuator 700. Similarly, as with pliable stops 671 and 672, pliable stops 771 and 772 need not be simple O rings as illustrated, but may be any pliable structure adapted to resist over extension of actuating arms 650, preferably without hard stops that could induce ringing during operation.

Figure 12:
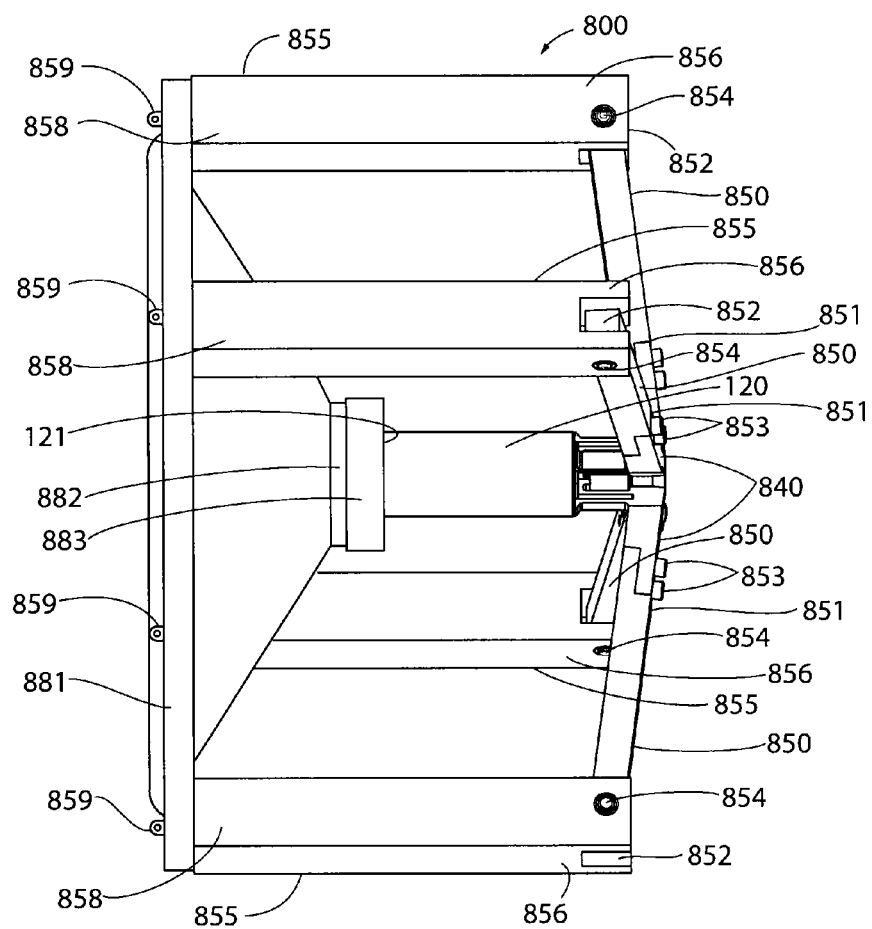
FIG. 12 is a side view of an embodiment of the actuator of the present invention adapted to operate as a speaker, having four actuating arms connected to an outer rim of a speaker cone and the compensator connected to the center of that cone.
Figure 13:
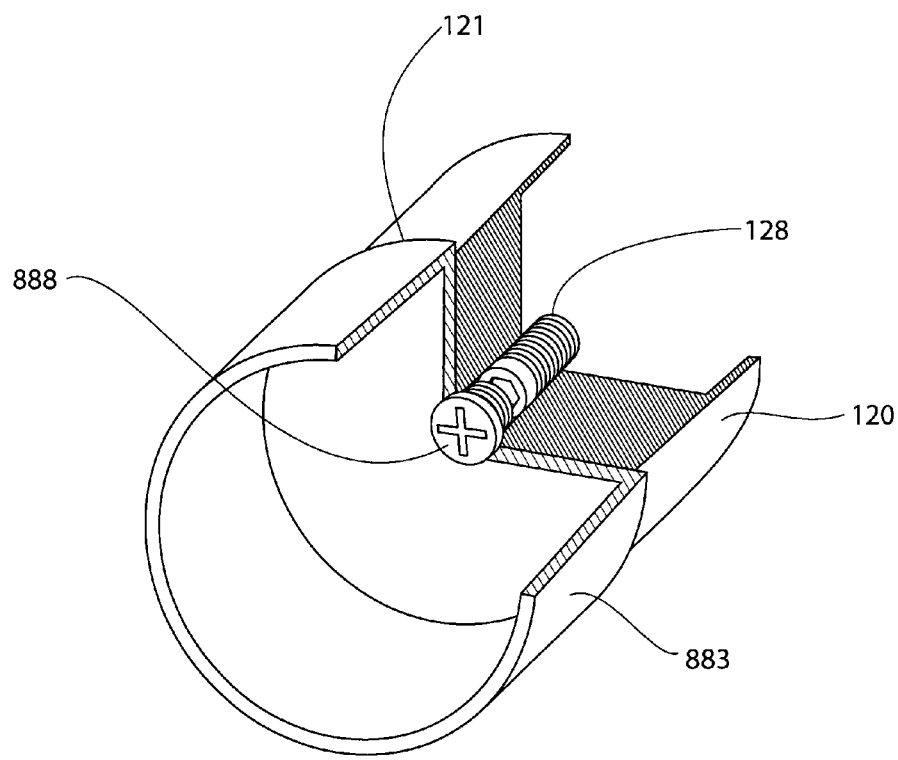
FIG. 13 is a detailed, perspective, cut away view of the attachment between the speaker cone and the compensator illustrated in FIG. 12.

As has been discussed, actuators of the present invention may be adapted to use in a wide variety of applications including, without limitation, grapplers; valves, pumps or switch actuators; energy capture devices; and sensors. One such application is an audio speaker, as illustrated in FIGS. 12 and 13. Actuator assembly 800 comprises compensator 120, having a first compensator end proximal to first mounting surface 121 (inside compensator 120) and, on that end, attachment means 888 adapted to attach compensator 120 to an external structure. While many such attachment means are possible, one convenient such means comprises threaded fastener 888 adapted to be received into compensator 120, behind preload screw 128, which may conveniently be in the form of a set screw with a head adapted to receive an alan wrench (not illustrated). Threaded fastener 888 may then be used to attach compensator 120, 120' to an external structure such as, without limitation, a light weight cup 883, preferably formed of plastic, as illustrated in FIG. 13.

Referring again to FIG. 12, with compensator 120 attached to an external structure such as cup 883, second actuating arm ends 852 may attach to a fixed structure such as outer speaker ring 881. This may be accomplished by adding extensions 855, having first extension end 856 and second extension end 858, attaching first extension end 856 to second actuating arm end 852, and attaching second extension end 858 to outer speaker ring 881. The attachment of second actuating arm end 852 is preferably accomplished with a mechanical fastener such as a bearing fastener 854 that allows some rotation of extension 855 as actuating arms 850 move, without allowing undue vibration. The attachment of second extension end 858 to outer speaker ring 881 may be accomplished with any of a variety of fasteners 859 or clips (not illustrated), adhesives (not illustrated), epoxies (not illustrated), clamps (not illustrated) or welds (not illustrated). In this way, actuating arms 850 are held substantially in place by outer speaker ring 881 with only limited movement possible.

To complete the driver, cup 883 may be affixed to speaker cone extension 882. Speaker cone extension 882 is preferably a light weight plastic or fiber tube affixed to speaker cone 880 substantially at its center, and extending back. Cup 883 may be adapted to fit tightly about speaker cone extension 882 and, if desired, affixed with adhesive (not illustrated). In this way, compensator 120 may be attached to speaker cone 880.

In such an embodiment, when an electric signal is applied to smart material device 160, it will expand as previously described, and contract back to its prior position when such signal dissipates. Such expansion will cause mechanical webs 840 to flex as previously described. However, given that actuating arms 850 are held by outer speaker ring 881, compensator 120 will move instead of actuating arms 850. In this way, actuator assembly 800 may serve as a highly efficient driver for speaker cone 880.

Figure 14:
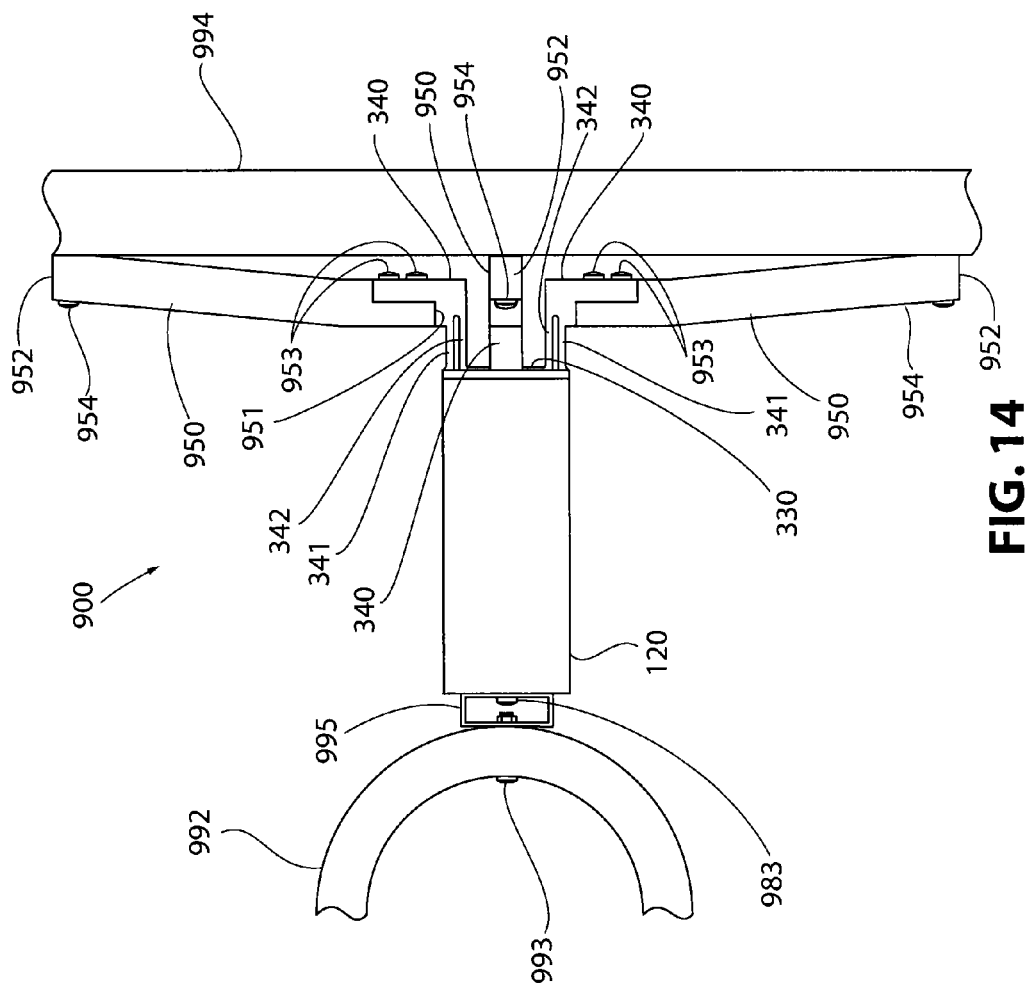
FIG. 14 is a side view of an embodiment of the actuator of the present invention adapted to operate as an energy capture device, having four actuating arms configured at an approximately one thirty-five degree angle with respect to the smart material device within the compensator, each actuating arm being connected to a mounting surface, and a compensator attached to a source of motion.

Another use of the actuator of the present invention is as an energy capture device, a preferred embodiment of which is illustrated on FIG. 14. Actuator assembly 900 is adapted for use as an energy capture device and, as with the previously described embodiments, comprises smart material device 160 (insider compensator 120, 120'), compensator 120, 120', a movable supporting member 330 (inside compensator 120), at least three mechanical webs 340, and at least three actuating arms 950. Compensator 120 has exterior mounting means 983 adapted to attach compensator 120 to a source of motion 992. In this case, exterior mounting means 983 may conveniently be a threaded mechanical fastener 983, substantially identical to fastener 883 described above, in conjunction with bracket 995. Other means, including without limitation other types of mechanical fasteners (not illustrated), clips (not illustrated), adhesives (not illustrated) epoxies (not illustrated), and the like, all of which will be apparent to those of ordinary skill in the art in light of this description, may also be utilized. Similarly, second actuating arm ends 952 comprise a means 954 to attach second actuating arm ends 952 to a rigid structure 994, which may conveniently be a wall, bracket, or mounting plate that is held substantially rigid with respect to source of motion 992. As illustrated, means 954 of attaching second actuating arm ends 952 may conveniently be a simple mechanical fastener 954, or may be any of a variety of clips (not shown), clamps (not shown), brackets (not shown), adhesives (not shown), epoxies (not shown), or similar means all of which will be apparent to one of skill in the art in light of this description. Substantially upon movement of exterior attachment means 983 by source of motion 992, compensator 120, 120' causes compliant members 341 and 342 of mechanical webs 340 to flex, thereby causing said movable supporting member 330 to move as has been previously described. Smart material device 160 (inside compensator 120, 120') is thereby caused to generate electrical energy from source of motion 992, which may conveniently be any source of vibration or other mechanical motion unlikely to exceed the operational limits of mechanical webs 340. Examples of convenient sources of motion 992 include motors, pumps, pipes, engines, moving fluids in a constrained area exhibiting turbulence, and a variety of other sources of motion that will be apparent to those of skill in the art in light of this specification. In this way, actuator assembly 900 provides an efficient means of converting otherwise wasted mechanical energy into useful electrical energy, which may then be used to power any suitable electrical load such as, without limitation, an electrical circuit such as a circuit adapted to charge a battery (not illustrated) or a capacitive device (not illustrated).

Figure 15:
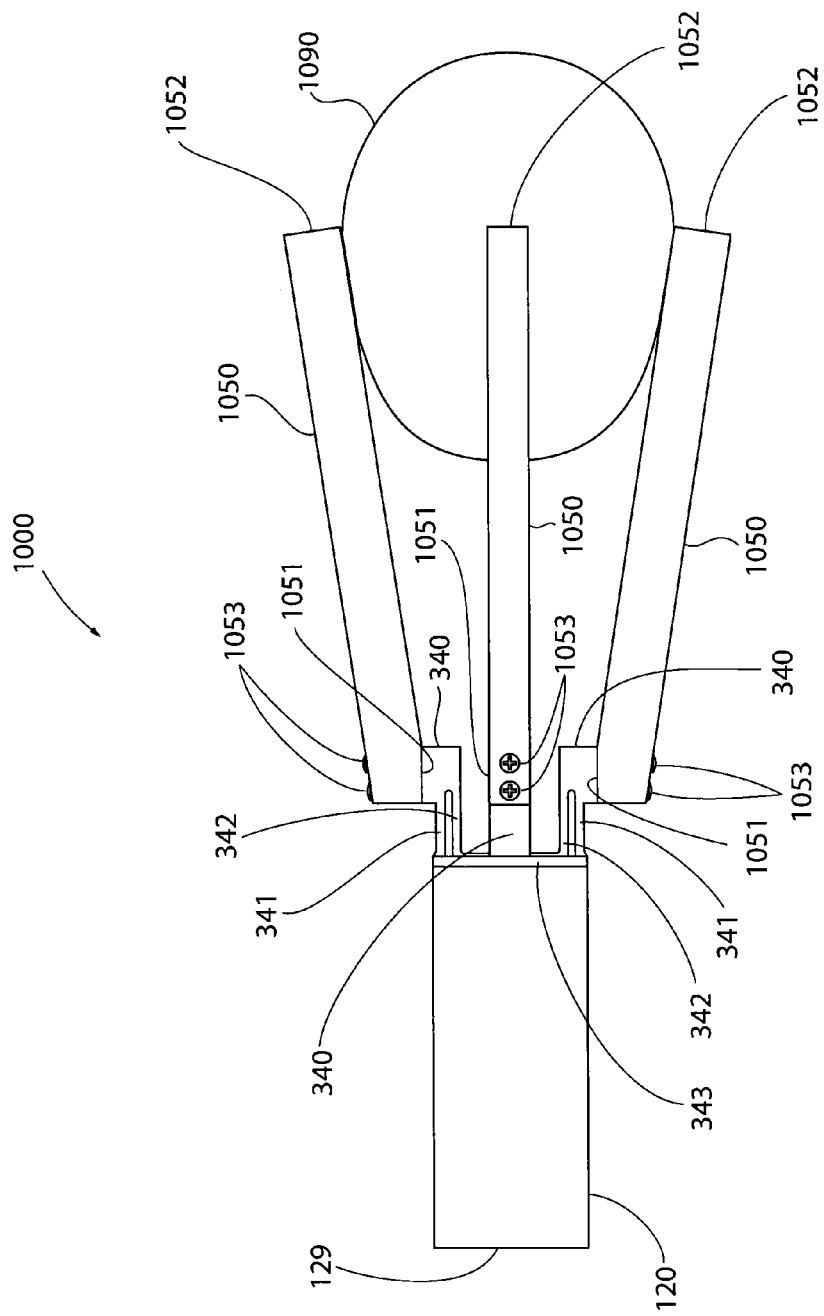
FIG. 15 is a side view of an embodiment of the actuator of the present invention adapted to operate as a sensor, having four actuating arms engaging a flexible bladder adapted to change size in response to changes in pressure.

Another suitable use for the actuator apparatus of the present invention is as a sensor. While the range of possible sensing uses is virtually unlimited, one exemplary sensing embodiment is illustrated in FIG. 15. Actuator assembly 1000, which comprises a smart material device 160 (inside compensator 120, 120'), compensator 120, 120', a movable supporting member 330 (inside compensator 120, 120'), at least three mechanical webs 340, and at least three actuating arms 1050, each of which has been described in connection with the description of previous embodiments. Compensator 120, 120' has a first mounting surface 129 adapted to enable compensator 120, 120' to be mounted to a fixed structure (not illustrated) when sensing of motion with respect to a fixed structure is required. Second actuating arm ends 1052 are attached to, or simply surround, a source of motion to be sensed, in this case bladder 1090, such that suitable motion causes actuating arms 1050 to cause first and second compliant members 341 and 342 to flex, thereby causing said movable supporting member 330 (inside compensator 120, 120') to move. As a result smart material device 160 generates an electrical signal that indicates the motion. As will be apparent to those of skill in the art in light of this description, that electrical signal may then be processed by commonly used sensor circuitry (not illustrated) to determine the degree of movement and, in some cases, its direction and speed. In the illustrated embodiment, the source of motion is substantially compliant bladder 1090, which is adapted to expand and contract according to changes in pressure. Thus, the embodiment illustrated provides an example of how actuator assembly 1000 may be used as a pressure sensor, which is but one of a wide range of sensor applications possible with the present invention.

Finally, it is disclosed herein that any of the embodiments of the actuator of the present invention may be further optimized to account for expansion and contraction resulting from temperature changes. In many cases, unloaded smart material device 160 will have a low, or even negative, coefficient of thermal expansion. As has been discussed, it is desirable in certain applications for smart material device 160 to be subject to a predetermined amount of compression, or preload. Applying preload will tend to raise the coefficient of thermal expansion of smart material device 160. Accordingly, smart material device 160 may be said to have a first coefficient of thermal expansion in its preloaded state.

Compensators 120, 120', 620 and rings 143, 343 will also each expand and contract according temperature changes according to their own coefficients of thermal expansion. Where the combined coefficient of thermal expansion of the assembled compensator/ring pair differs from the first coefficient of thermal expansion of smart material device 160, temperature changes can cause the location of actuating arms 150, 350, 450, 650, 850, 950, 1050 to change, both for their activated states and when at rest. Where the combined coefficient of thermal expansion of the assembled compensator/ring pair is balanced with the first coefficient of thermal expansion of smart material device 160, however, are balanced, actuating arms 150 350, 450, 650, 850, 950, 1050 will tend to remain in their intended positions as temperatures vary.

To address this concern in applicable embodiments of actuator assemblies 100, 100', 200, 300, 400, 500, 600, 700, 800, 900, 1000, compensator 120, 120', 620 and ring 143, 343 may be formed from materials having different coefficients of thermal expansion. One such material suitable for ring 143, 343 is 17-4 stainless steel, while a material having a different coefficient of thermal expansion suitable for compensators 120, 120', 620 would be Invar. Where compensator 120, 120', 620 and ring 143, 343 are selected from materials with different coefficients of thermal expansion, they may be sized (for example by increasing the length of ring 143, 343 and decreasing length of compensator 120, 120', 620), such that, when joined, the combined coefficient of thermal expansion of the compensator/ring assembly is substantially equal to the first coefficient of thermal expansion of smart material device 160 at its determined preload. In this way, as temperatures change, the expansion or contraction of the compensator/ring assembly will substantially match the expansion or contraction of smart material device 160 attributable to thermal conditions. As a result, a substantially consistent arm position will be maintained and operating efficiency can be enhanced.

Other variations and embodiments of the present invention will be apparent to those of ordinary skill in the art in light of this specification, all of which are within the scope of the present invention as claimed.

We claim:

1. An actuator apparatus comprising a smart material device, a compensator, a movable supporting member, at least three mechanical webs, and at least three actuating arms wherein
    (a) said compensator has a first mounting surface,
    (b) said mechanical webs comprise a first compliant member attached to said compensator and a second compliant member attached to said movable supporting member
    (c) said movable supporting member comprises a second mounting surface opposed and substantially parallel to said first mounting surface,
    (d) said actuating arms comprise a first actuating arm end attached to one said mechanical web and an opposed second actuating arm end;
    (e) said mechanical webs are spaced around said movable supporting member; and
    (f) said smart material device is affixed between said first mounting surface and said second mounting surface; wherein
    application of an electrical potential causes said smart material device to expand substantially without angular movement of said smart material device, thereby urging said movable supporting member away from said first mounting surface and causing said first and second compliant members to flex, thereby moving said actuating arms such that motion of said second actuating arm end is across a distance greater than the expansion of said smart material device.

2. The actuator apparatus of claim 1 wherein
    (a) said actuating arms are each of substantially the same length and said spacing of said mechanical webs is substantially even such that the distance between each two adjacent mechanical webs is substantially identical;
    (b) said actuating arms are spaced radially about said smart material device; and
    (c) said mechanical webs are adapted such that substantially upon flexing of said compliant members said second actuating arm ends move toward said smart material device.

3. The actuator apparatus of claim 1 wherein
    (a) said second actuating arm ends are adapted to attach to a supporting structure;
    (b) a central axis through the center of said smart material device extends through said first mounting surface and said second mounting surface;
    (c) for each said actuating arm, an actuating arm axis extends through said actuating arm's first actuating arm end and said second actuating arm's second actuating arm end; and
    (d) the angle between said central axis and each said actuating arm axis is at least ninety one and at most one hundred thirty-five degrees.

4. The actuator apparatus of claim 1 wherein
    (a) said second actuating arm ends are adapted to attach to a supporting structure;
    (b) a central axis through the center of said smart material device extends through said first mounting surface and through said second mounting surface;
    (c) for each said actuating arm, an actuating arm axis extends through said actuating arm's first actuating arm end and said second actuating arm's second actuating arm end; and
    (d) the angle between said central axis and each said actuating arm axis is at least forty five and at most eighty nine degrees.

5. The actuator apparatus of claim 1 wherein
    (a) said compensator comprises a means of attaching said compensator to a supporting structure;
    (b) a central axis through the center of said smart material device extends through said first mounting surface and through said second mounting surface;
    (c) for each actuating arm, an actuating arm axis extends through said actuating arm's first actuating arm end and said second actuating arm's second actuating arm end; and
    (d) the angles between said central axis and each said actuating arm axis is no more than fifty degrees.

6. The actuator apparatus of claim 1 wherein
    (a) said compensator comprises a means of attaching said compensator to a supporting structure;
    (b) a central axis through the center of said smart material device extends through said first mounting surface and through said second mounting surface;
    (c) for each actuating arm, an actuating arm axis extends through said actuating arm's first actuating arm end and said second actuating arm's second actuating arm end; and
    (d) the angle between said central axis and each said actuating arm axis is at least one hundred thirty degrees and no more than one hundred eighty degrees.

7. The actuator apparatus of claim 1 wherein said actuating arms are removably attached to said mechanical webs and at least one said mechanical web is formed of a different material than said actuating arms.

8. The actuator apparatus of claim 1 further comprising potting material wherein
(a) said compensator is substantially in the form of a canister;
(b) said compensator contains said potting material; and
(c) said potting material substantially fills the space between said compensator and said smart material device.

9. The actuator apparatus of claim 8 further comprising a continuous ring attached to said first compliant members wherein
(a) said compensator comprises a first open compensator end;
(b) said first open compensator end and said ring comprise a means of attaching said compensator to said ring such that said ring remains joined to said compensator upon activation of said smart material device whereby said first compliant members are attached to said compensator.

10. The actuator apparatus of claim 9 wherein said attaching means comprises generally helical threads formed on both said compensator and said ring and adapted to allow said compensator to be threaded onto said ring.

11. The actuator apparatus of claim 10 further comprising at least one thrust pad between said first mounting surface and said smart material device wherein
(a) said smart material device, said compensator, said attachment means, said thrust pad, and said second mounting surface are adapted such that when said first attachment means is fully engaged, said smart material device is compressed between said first mounting surface and said second mounting surface, thereby applying a predetermined preload on said smart material device;
(b) said thrust pad is adapted to reduce twisting of said smart material device upon threading of said compensator to said ring; and
(c) said second mounting surface comprises means to prevent twisting of said smart material device upon threading of said compensator to said ring.

12. The actuator apparatus of claim 9 wherein
(a) said compensator and said ring are of materials having different coefficients of thermal expansion;
(b) said smart material device is compressed between said first mounting surface and said second mounting surface to a predetermined level of preloading;
(c) said preloaded smart material device has a first coefficient of thermal expansion, and
(d) said compensator and said ring are adapted, such that when joined, said compensator and said ring have a combined coefficient of thermal expansion substantially equal to said first coefficient of expansion.

13. The actuator apparatus of claim 9 wherein said compensator, said ring and said potting material are adapted such that substantially upon full engagement of said attachment means, said smart material device is substantially sealed whereby said smart material device is substantially protected from external humidity and contamination.

14. The actuator apparatus of claim 1 wherein said compensator further comprises a preload screw adapted to engage said first mounting surface such that, upon tightening said preload screw, the compression of said smart material device is increased and, upon loosening said preload screw, said compression of said smart material device is decreased.

15. The actuator apparatus of claim 1 further comprising
(a) a first electrode electrically connected to said smart material device proximate to said second mounting surface;
(b) an insulator between said electrode and said second mounting surface;
(c) a second electrode electrically connected to said compensator; and
(d) an electrical connection between said smart material device and said compensator whereby application of an electrical potential to said first electrode and said second electrode causes said smart material device to urge said second mounting surface away from said first mounting surface.

16. The actuator apparatus of claim 15 wherein said compensator is formed of an electrically conductive material, and contact between said smart material device and said first mounting surface forms said electrical connection between said smart material device and said compensator.

17. The actuator apparatus of claim 1 further comprising at least one dampener attached to said compensator and movably attached to at least said one actuating arm, said dampener comprising a pliable stop between said actuating arm and said compensator.

18. The actuator apparatus of claim 1 further comprising an external dampening yoke and at least one dampener attached to said dampening yoke and movably attached to at least one said actuating arm, said dampener comprising a pliable stop between said actuating arm and said dampening yoke.

19. The actuator apparatus of claim 1 wherein
(a) said compensator has a first compensator end proximal to said first mounting surface,
(b) said first compensator end comprises a compensator attachment means adapted to attach said compensator to an external structure, and
(c) said second actuating arm ends comprise a means to attach said second actuating arm end to a fixed structure whereby
said actuating arms are held substantially in place by said fixed structure, such that activation of said smart material device causes said compensator to move, thereby moving said compensator attachment means.

20. The actuator apparatus of claim 19 further comprising a speaker cone comprising an outer speaker ring wherein
(a) said means to attach said actuating arm ends is a mechanical fastener, and said external structure is said outer speaker ring;
(b) said compensator attachment means is a mechanical fastener connecting said compensator to substantially the center of said speaker cone;
whereby movement of said actuator causes movement of said speaker cone.

21. A sensor comprising a smart material device, a compensator, a movable supporting member, at least three mechanical webs, and at least three actuating arms wherein
(a) said compensator has a first mounting surface,
(b) said mechanical webs comprise a first compliant member attached to said compensator and a second compliant member attached to said movable supporting member
(c) said movable supporting member comprises a second mounting surface opposed and substantially parallel to said first mounting surface,
(d) said actuating arms comprise a first actuating arm end attached to one said mechanical web and an opposed second actuating arm end attached to a source of motion;
(e) said mechanical webs are spaced around said movable supporting member; and
(f) said smart material device is affixed between said first mounting surface and said second mounting surface; whereby substantially upon movement of said source of motion, said actuating arms cause said first and second compliant members to flex, thereby causing said movable supporting member to move, thereby causing said smart material device to generate an electrical signal indicating the degree of said movement of said source of motion.

22. The sensor of claim 21 wherein said source of motion is a substantially compliant bladder adapted to expand and contract according to changes in pressure.

23. An energy capture apparatus comprising a smart material device, a compensator, a movable supporting member, at least three mechanical webs, and at least three actuating arms wherein
   (a) said compensator comprises a first interior mounting surface and an exterior mounting means adapted to attach said compensator to a source of motion,
   (b) said mechanical webs comprise a first compliant member attached to said compensator and a second compliant member attached to said movable supporting member
   (c) said movable supporting member comprises a second mounting surface opposed and substantially parallel to said first interior mounting surface;
   (d) said actuating arms comprise a first actuating arm end attached to one said mechanical web and an opposed second actuating arm end comprising a means to attach said second actuating arm end to a rigid structure;
   (e) said mechanical webs are spaced around said movable supporting member; and
   (f) said smart material device is affixed between said first mounting surface and said second mounting surface;

wherein substantially upon movement of said exterior attachment means by said source of motion, said compensator causes said compliant members to flex, thereby causing said movable supporting member to move, thereby causing said smart material device to generate electrical energy from said source of motion.

\* \* \* \* \*